(12) United States Patent
Celozzi (10) Patent No.: US 11,444,792 B2
(45) Date of Patent: Sep. 13, 2022

(54) METHOD AND APPARATUS FOR LICENSING CONTROL IN A VIRTUAL NETWORK ENVIRONMENT

(71) Applicant: Telefonaktiebolaget LM Ericsson (publ), Stockholm (SE)

(72) Inventor: Giuseppe Celozzi, Salerno (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 683 days.

(21) Appl. No.: 16/323,291

(22) PCT Filed: Aug. 5, 2016

(86) PCT No.: PCT/EP2016/068763
§ 371 (c)(1),
(2) Date: Feb. 5, 2019

(87) PCT Pub. No.: WO2018/024341
PCT Pub. Date: Feb. 8, 2018

(65) Prior Publication Data
US 2021/0288827 A1 Sep. 16, 2021

(51) Int. Cl.
*H04L 12/14* (2006.01)
*H04L 41/5003* (2022.01)
*H04L 41/50* (2022.01)

(52) U.S. Cl.
CPC .......... *H04L 12/1467* (2013.01); *H04L 12/14* (2013.01); *H04L 12/1407* (2013.01);
(Continued)

(58) Field of Classification Search
CPC ............. H04L 12/1467; H04L 41/5003; H04L 12/1407; H04L 12/1435; H04L 41/5029; H04L 12/14; H04T 2001/215
See application file for complete search history.

(56) References Cited

U.S. PATENT DOCUMENTS

| 8,104,038 B1 * | 1/2012 | Graupner | G06F 8/63 |
| | | | 718/104 |
| 9,578,008 B2 * | 2/2017 | Sood | H04L 63/0209 |

(Continued)

FOREIGN PATENT DOCUMENTS

| WO | 03 081444 A1 | 10/2003 |
| WO | 2010 008635 A1 | 1/2010 |

(Continued)

OTHER PUBLICATIONS

Cisco Elastic Services Controller: Simplify and Automate the Virtualized Environment, Cisco White Paper—2015.
(Continued)

*Primary Examiner* — Nishant Divecha
(74) *Attorney, Agent, or Firm* — Baker Botts, LLP (57) ABSTRACT

A method for monitoring operation of a network service for the purpose of licensing control in a virtual network environment managed by a Network Functions Virtualisation Management and Orchestration, NFV-MANO, system, is disclosed. The method comprises: defining (202) the network service in a Network Service Descriptor and deploying the network service using at least one Virtual Network Function instance identified in said Network Service Descriptor by instantiating (204) at least one Virtual Network Function Component defined by a Virtualisation Deployment Unit, wherein said Virtualisation Deployment Unit is associated with said Virtual Network Function. The method also comprises recording (206) in a first information field associated with the Network Service Descriptor information indicative of usage of the at least one instantiated Virtual Network Function Component and maintaining (208) a licensing database for storing information indicative of usage of the at least one instantiated Virtual Network
(Continued)

Function Component based on records in the first information field.

17 Claims, 6 Drawing Sheets

(52) U.S. Cl.
CPC ...... *H04L 12/1435* (2013.01); *H04L 41/5003* (2013.01); *H04L 41/5029* (2013.01); *H04L 12/1403* (2013.01)

(56) References Cited

U.S. PATENT DOCUMENTS

| | | | |
|---|---|---|---|
| 10,348,517 B2* | 7/2019 | McNamee | H04L 63/06 |
| 10,904,158 B2* | 1/2021 | Saha | H04L 47/70 |
| 2005/0165693 A1* | 7/2005 | Moritzen | G06Q 30/00 705/59 |
| 2005/0289072 A1 | 12/2005 | Sabharwal | |
| 2006/0179058 A1 | 8/2006 | Bram et al. | |
| 2016/0057102 A1 | 2/2016 | Wei et al. | |

FOREIGN PATENT DOCUMENTS

| | | |
|---|---|---|
| WO | 2013 050059 A1 | 4/2013 |
| WO | 2016 062115 A1 | 4/2016 |

OTHER PUBLICATIONS

ETSI GS NFV 003 v1.2.1; Group Specification; Network Functions Virtualisation (NFV); Terminology for Main Concepts in NFV—Dec. 2014.
ETSI GS NFV-MAN 001 v1.1.1; Group Specification; Network Functions Virtualisation (NFV); Management and Orchestration—Dec. 2014.
GS NFV-MAN 001 v0.6.0 (pp. 101-197)—Jun. 2014.
Framework How-To Guide; Impact of SDN/NFV on Charging and Billing; Release 15.5.0—Dec. 2015.
NFVIFA(16)??; Title: Proposal of functional requirement and flow, interface of License Management for NFV Orchestrator; from Source: KT (Korea Telecom)—Submission date Apr. 25, 2016.
International Search Report for International application No. PCT/EP2016/068763—dated Mar. 30, 2017.
Examination Report issued by Intellectual Property India for Application No. 201917004197—dated Aug. 19, 2020.
Frameworx How-To Guide, Impact of SDN/NFV on Charging and Billing; TMForum; GB989; Release 15.5.0—Dec. 2015.

* cited by examiner

METHOD AND APPARATUS FOR LICENSING CONTROL IN A VIRTUAL NETWORK ENVIRONMENT

PRIORITY

This nonprovisional application is a U.S. National Stage Filing under 35 U.S.C. § 371 of International Patent Application Serial No. PCT/EP2016/068763 filed Aug. 5, 2016 and entitled "Method and Apparatus for Licensing Control in a Virtual Network Environment" which is hereby incorporated by reference in its entirety.

TECHNICAL FIELD

The present invention relates to Network Functions Virtualisation, in general, and in particular to licensing control in a virtual network environment managed by a Network Functions Virtualisation Management and Orchestration, NFV-MANO, system.

BACKGROUND

It is known to apply virtualization to network functions in communications networks. Benefits of such network function virtualization NFV derive partly from replacing silos of monolithic and proprietary, and therefore expensive, hardware service platforms in the communications infrastructure by abstracted services run as applications on an open and commodity, and therefore cheaper, compute, storage and network infrastructure. An example architectural framework is under development within the European Telecommunications Standards Institute, ETSI, known as NFV, and some features of this are summarized below with respect to FIG. 1.

Telecoms networks currently contain a variety, which is tending to increase, of proprietary hardware appliances. Each network service may use a separate hardware appliance. Hardware lifecycles are becoming shorter, reducing the return on investment of deploying new services in an increasingly network-centric world. NFV is a new network operator-led Industry Specification Group, ISG, in ETSI to work through the technical challenges for Network Functions Virtualization. Network Functions Virtualization, NFV, aims to address these problems by evolving standard IT virtualization technology to consolidate many network equipment types onto industry standard high volume servers, switches and storage.

NFV involves implementing network functions in software that can run on a range of industry standard server hardware, and that can be moved to, or instantiated in, various locations in the network as required, without the need to install new equipment. NFV decouples software implementations of Network Functions from the compute, storage, and networking resources through a virtualization layer.

Figure 1:
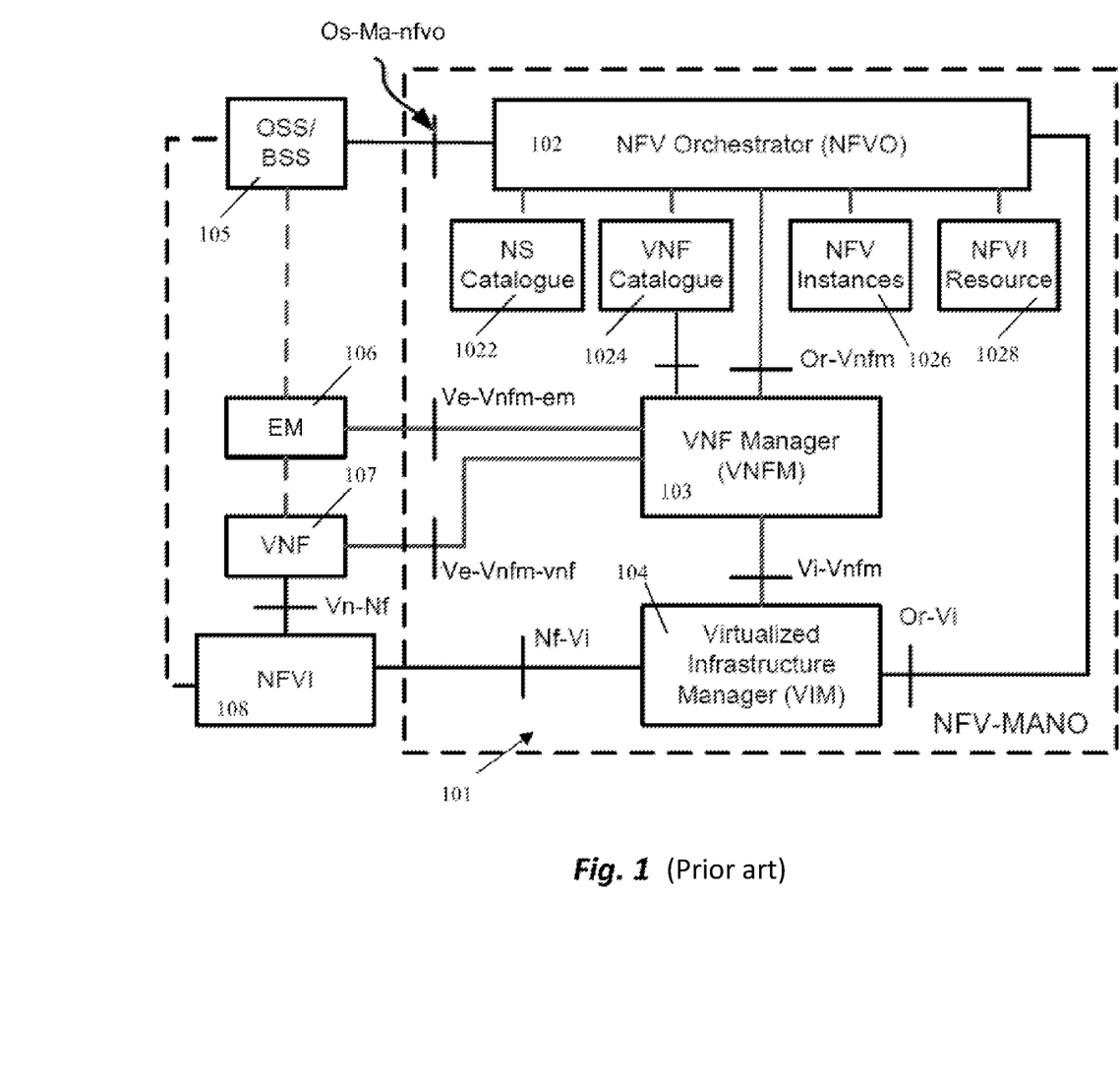
FIG. 1 is a diagram illustrating NFV-MANO architectural framework with reference points as defined in the ETSI NFV-MANO standard.

FIG. 1 shows a schematic view of other entities involved in an example of management of Virtual Network Functions (VNFs) and their relationships with VNF Manager 103. The VNF Manager 103 is one part of an NFV Management and Operations, NFV-MANO, 101, and is responsible for VNF life-cycle management. Specifically, the VNF Management functions responsible for the VNF's lifecycle management include:
  instantiating VNF, i.e. create a VNF using the VNF on-boarding artefacts;
  VNF scaling, i.e. increasing or reducing the capacity of the VNF;
  updating and/or upgrading VNF;
  terminating VNF, this involves releasing VNF-associated NFVI resources and returning them to NFVI resource pool.

The VNF Manager, 103, can be configured to carry out allocation of instances of Virtual Network Function Components, VNFCs, to hosts. The allocation may be prompted based on a request received from an OSS/BSS 105, or from another part of the NFV-MANO, 101. The OS S/BSS can be a conventional operational support system and business support system. The function of the NFV-MANO is governing service orchestration, automation and administration. It can have access to stored descriptions of services (also known as descriptors), of VNFs, and of infrastructure. In this case the entities are based on the published ETSI standard: Network Functions Virtualisation (NFV) Management and Orchestration; ETSI GS NFV-MAN 001 V1.1.1 (2014-12). Coupled to the OSS/BSS, 105, there is an Element Management System, EMS, 106. This manages elements used in carrying the traffic across the network and makes use of a number of Virtual Network Functions 107. The Virtual Network Functions (VNF) may make use of Network Functions Virtualization Infrastructure, NFVI, 108. The NFVI can have virtual compute parts, virtual storage parts and virtual network parts and a virtualization layer, on physical computer hardware, physical storage hardware and physical network hardware. The NFV-MANO 101 further comprises an NFV Orchestrator, NFVO, 102, one or more VNF Managers 103 and a Virtualized Infrastructure Manager, VIM, 104 coupled to the VNF Manager, 103.

There is an interface called reference point Ve-Vnfm-em between on the one side the EMS 106 and the VNF, 103, and Ve-Vnfm-vnf between VNF, 107, and VNFM, 103 on the other side. An interface called reference point Or-Vi is provided between the NFV Orchestrator 102 and VIM 104. An execution reference point Vn-Nf is shown between the VNF 107 and the NFVI 108. An interface called reference point Or-Vnfm is provided between the NFV Orchestrator 102 and VNF Manager 103. An interface called reference point Vnfm-Vi is provided between the VIM 104 and the VNF Manager 103. These interfaces and the functions of the different entities follow the arrangement known from the ETSI NFV standard in this example.

The NS Catalogue, 1022, represents the repository of all of the on-boarded Network Services, the VNF Catalogue, 1024, represents the repository of all of the on-boarded VNF Packages, the NFV Instances, 1026, is a repository that holds information of all VNF instances and Network Service instances and the NFVI Resources, 1028, is a repository that holds information about available/reserved/allocated NFVI resources as abstracted by the VIM across operator's Infrastructure Domains.

Because virtualisation decouples hardware from functions implemented in software and delivering specific network services it is necessary to implement control over deployment of the Virtual Network Functions in form of licensing so that the supplier of the Virtual Network Functions can be rewarded (paid) for the use of these VNFs. License management has the goal to prevent installation and execution of unauthorized copies of products on platforms different from the one they were sold for. In order to guarantee correct handling of the application and to enforce contractual obligations licensing features included in all applications (software implementing the Virtual Network Functions).

Each capability can be associated with a single license where the quantity licensed can be defined as a number of Network Services/Virtual Network Functions used. When licensing (charging) on a per Network Service or a per Virtual Network Function basis cannot be considered as adequate then more sophisticated measures are needed and for instance each VNF or NS can be weighed based on the number of connections, number of ports or number of subscribers that the VNF or NS can support.

Features licensing is a mechanism where a license key is necessary to activate and use certain features of the system.

One can identify two types of licensing:
- right to use; this is a licensing mechanism that is related to applications and to the host where the applications are executed and is based on the ability to use any one feature of the application while executed on the host;
- right to connect/quantity based licenses allow the user to use an application based on some quantitative parameter like number of subscribers, number of connections, number of SMS, etc.

According to the definitions given above in the case of a right to use licensing only the first time the application is initiated the license manager is contacted to check if there is a valid license activated for the application. When the license is a right to connect/quantity based then every time the application is initiated for a specific item or network element the check on the available quantity must be repeated by the application. This is because the total quantity of connections used is increasing with each new start of the application. For Network Services or Network Function Virtualisation both cases can apply.

Licenses can be pre-paid and post-paid. In the former case the capacity is bought upfront and after that the used licenses are subtracted from the total. In the latter case the actually used capacity is monitored and reported so that the owner of the application could be paid based on the actual usage.

The licenses are a measure of the capabilities that a system can provide to the customer. A number of different applications can be sold to a customer and for each application a number of functions are provided by the system. In order to guarantee that customer pays for the right number of licenses the application database must be kept up to date.

The NFV standard identified earlier, ETSI GS NFV-MAN 001 V1.1.1 (2014-12), does not provide any solution for licensing control for software implementing Virtual Network Functions. This makes license enforcement difficult and requires a separate solution, often via a 3$^{rd}$ party product, that is not integrated in the architecture of NFV-MANO.

SUMMARY

It is the object of the present invention to obviate at least some of the above disadvantages and provide an improved apparatus and method for licensing control in a virtual network environment.

Accordingly, the invention seeks to preferably mitigate, alleviate or eliminate one or more of the disadvantages mentioned above singly or in any combination.

According to a first aspect of the present invention there is provided a method for monitoring operation of a network service for the purpose of licensing control in a virtual network environment managed by a Network Functions Virtualisation Management and Orchestration, NFV-MANO, system. The method comprises defining the network service in a Network Service Descriptor and deploying the network service using at least one Virtual Network Function instance. The at least one Virtual Network Function instance is identified in said Network Service Descriptor. The Virtual Network Function is deployed by instantiating at least one Virtual Network Function Component defined by a Virtualisation Deployment Unit, wherein said Virtualisation Deployment Unit is associated with said Virtual Network Function. The method also comprises recording in a first information field associated with the Network Service Descriptor information indicative of usage of the at least one instantiated Virtual Network Function Component and maintaining a licensing database for storing information indicative of usage of the at least one instantiated Virtual Network Function Component based on records in the first information field.

According to a second aspect of the present invention there is provided an apparatus for monitoring operation of a network service for licensing control in a virtual network environment managed by a Network Functions Virtualisation Management and Orchestration, NFV-MANO, system. The apparatus comprises a processor and a memory. The memory contains instructions executable by the processor such that the apparatus is operative to define the network service in a Network Service Descriptor and to deploy the network service using at least one Virtual Network Function instance identified in said Network Service Descriptor. The at least one Virtual Network Function instance is deployed by instantiating at least one Virtual Network Function Component defined by a Virtualisation Deployment Unit. Said Virtualisation Deployment Unit is associated with said Virtual Network Function. The apparatus is also operative to record in a first information field associated with the Network Service Descriptor information indicative of usage of the at least one instantiated Virtual Network Function Component and to maintain a licensing database for storing information indicative of usage of the at least one instantiated Virtual Network Function Component based on records in the first information field.

Further features of the present invention are as claimed in the dependent claims.

The present invention provides the following advantages:
License capacity can be shared by several VNFs.
The solution is applicable to all licenses in the system NSL and IRL to both pre-paid and post-paid licensing types.
By integrating the license management into the NFV-MANO system license handling is simplified and the likelihood of violations of license conditions is reduced.
Monitoring of VNFC instantiation is performed as part of VNF management and orchestration so reporting is reliable.
The solution is integrated with auto-scaling policies, which guarantees that capacity changes will be reflected in reported values and accurately billed/invoiced.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned earlier the NFV standard, ETSI GS NFV-MAN 001 V1.1.1 (2014-12), does not provide any solution for licensing control for software implementing Virtual Network Functions and it is necessary to rely on separate solutions that are not integrated into the architecture of NFV-MANO. The disadvantage of these separate solutions is that any variation of capacity that is triggered by a scaling or relocation cannot be tracked and in consequence capacity of licenses cannot be recalculated. Thus there is no way of reporting of increase of capacity or even violation of a license.

There are two main aspects related to licensing in virtualised network environment. The first one is related to the network service. The owner of the Network Service or of a single VNF (virtual network function) or PNF (physical network function) that are on boarded and instantiated, upon request of the user of the telecommunication service, are regulated by specific use licenses; the use licenses can be related to the features provided or to the capacity of telecommunication service provided. This will be referred to as Network Service Licensing (NSL). The second one is related to hardware and software services that the Network Service and implementing it Virtual Network Function use. The Owner of the Network Service or of the single VNF or PNF, that are instantiated upon request of the user of the Telecommunication Service, will make use of $3^{rd}$ party software, from specific Hardware and Software, like for instance Hardware or Software accelerators, but also specific services, for which the use is regulated by a license to be activated to either the owner of the $3^{rd}$ party software or by the owner of the VIM in case resources both hardware, software provided require licensing. This will be referred to as Infrastructure Resource Licensing (IRL). Infrastructure Resource Licensing will cover the following:

Software used by VNFs delivered within the VNF itself. This is related to the fact that one VNF may rely on another, one or more, Virtual Network Functions.

Hardware and software deployed in a datacentre (DC) that may be subject to $3^{rd}$ party licensing and may need to be reported from the DC owner to the $3^{rd}$ party supplier.

Resources and services available in the datacentre for the application and provided by the DC owner.

For clarity, in the NFV-MANO model the Network Services and Infrastructure Resources may be realised by instantiating Virtual Network Function Components.

The inventor realised that it would be advantageous if both, NSL and IRL, were considered and managed in the NFV-MANO model. In this inventive approach deployment of Virtual Network Function Components and their associated licenses in a virtual environment (also referred to as cloud) should be tracked in relationship with the VNF lifecycle management within the VNF Management and NFV Orchestration.

The ETSI NFV-MANO model includes a Network Service Descriptor and Virtual Deployment Unit that can be modified so that license information can be associated with the NSD and VDU themselves and handling therefore integrated in the lifecycle management of the VNFs.

Figure 2:
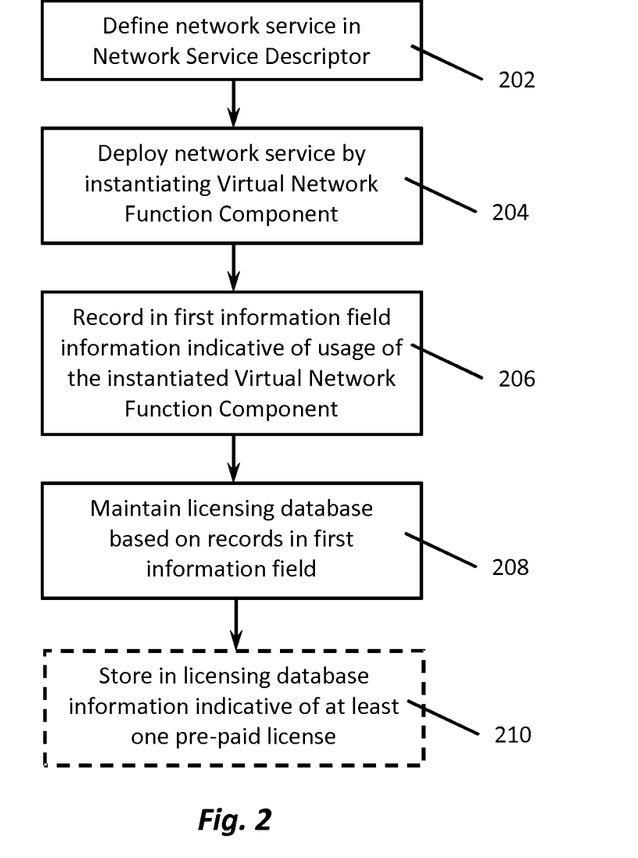
FIG. 2 is a flowchart illustrating a method for monitoring operation of a network service for licensing control in a virtual network environment in one embodiment of the present invention.

With reference to FIG. 2 an embodiment of a method for monitoring operation of a network service for the purpose of licensing control in a virtual network environment is illustrated. The virtual network environment is managed by a Network Functions Virtualisation Management and Orchestration system, NFV-MANO. The method comprises defining, 202, the network service in a Network Service Descriptor (NSD). A Network Service Descriptor is a deployment template for a Network Service referencing all other descriptors which describe components that are part of that Network Service. It is used by the NFV Orchestrator to instantiate a Network Service and also describes deployment flavours of Network Service. In the following operations the network service is deployed using at least one Virtual Network Function instance identified in said Network Service Descriptor. The Virtual Network Function is deployed by instantiating, 204, at least one Virtual Network Function Component defined by a Virtualisation Deployment Unit. Said Virtualisation Deployment Unit is associated with said Virtual Network Function. The method further comprises recording, 206, in a first information field associated with the Network Service Descriptor information indicative of usage of the at least one instantiated Virtual Network Function Component.

The order of operations of deploying the network service by instantiating the VNFC, 204, and recording, 206, is not important. It is possible to first record the indication of usage of the VNFC and persist the information once the VNFC is actually instantiated, or the operations may be carried out simultaneously, or as illustrated in FIG. 2 in which recording, 206, follows instantiation of the VNFC, 204.

The method further comprises maintaining, 208, a licensing database for storing information indicative of usage of the at least one instantiated Virtual Network Function Component based on records in the first information field.

Preferably, if pre-paid licences are used the method comprises storing in the licensing database information indicative of at least one pre-paid license, 210.

In a preferred embodiment usage of each instantiated Virtual Network Function Component is recorded in the first information field associated with the NSD, however, in alternative embodiments it is possible for the supplier of the Virtual Network Functions to offer concessions, for example only four out of five instantiated VNFCs need to be recorded. An alternative way in which the same concessions could be offered and implemented is by applying them at the operation of billing/invoicing.

The embodiment described above allows for a very simple licensing control in which instantiated VNFCs are recorded and the network operator is charged based on the number of instantiated VNFCs. This approach covers one way of handling deployments for which capacity provided by the instantiated VNFC cannot be directly correlated with the number of instantiated VNFCs, or where capacity is not relevant. It also covers licensing of $3^{rd}$ party software or hardware.

Figure 3:
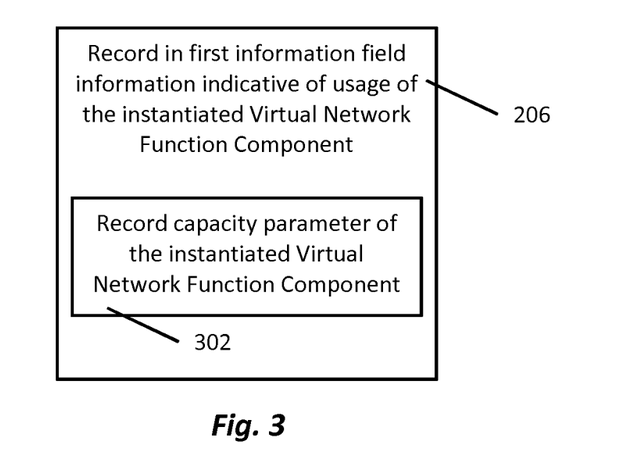
FIG. 3 and FIG. 4 are flowcharts illustrating recording of indicative of usage of instantiated Virtual Network Function Component in one embodiment of the present invention.

In a preferred embodiment the operation of recording, 206, comprises recording a capacity parameter, 302, of the at least one instantiated Virtual Network Function Component as illustrated in FIG. 3. The capacity parameter is obtained from a second information field associated with the Virtualisation Deployment Unit defining said instantiated Virtual Network Function Component.

In a preferred embodiment the capacity information is first recorded in an information field associated with the VDU which defines the VNFC and then the capacity obtained from the VDU is also used to update records in information field associated with the NSD. There may be one or more VNFCs defined in the VDU. For example capacity of a single VNFC may not be enough to satisfy the need of the network and it is necessary to instantiate more than one VNFC. This would be recorded in the VDU and therefore the VDU is a reliable source of information about the capacity provided by the VNFCs.

As far as the first information field associated with the Network Service Descriptor is concerned, in one embodiment the monitoring_parameter field included in the Network Service Descriptor as defined in the ETSI NFV-MANO standard may be used for the role of the first information field. Alternatively, it may be a dedicated information field added to the information structure of the Network Service Descriptor. In yet another embodiment it may be a dedicated file associated with the Network Service Descriptor. Similarly, for the second information field associated with the Virtualisation Deployment Unit the monitoring_parameter field included in the Virtualisation Deployment Unit as defined in the ETSI NFV-MANO standard may be used. Alternatively, it may be a dedicated information field added to the information structure of the Virtualisation Deployment Unit. In yet another embodiment it may be a dedicated file associated with the Virtualisation Deployment Unit.

As described above in one embodiment it is proposed to correlate the license capacity with the monitoring_parameter field included in the Network Service Descriptor of NFV ETSI standard MANO model which includes information regarding Service Level Agreement (SLA) and autoscale actions. This allows for reporting capacity of a VNFC instance and when scaling should take place in order to account for changes in actual capacity handled.

The ETSI NFV-MANO standard models a NS with a Network Service Descriptor (NSD) and VDU for all its elements. For pre-paid licensing NSD and VDU shall include information on the type and the quantity of licensing currently available for this NS. Furthermore the relationship of the VDUs to $3^{rd}$ party licenses should be included in the descriptor (i.e. in the fields added or in the existing fields that will include the licensing information added to the descriptors like VDU, NSD and VNFD) or in separate files associated with the descriptors. Licenses of the same type are based on the same type of Performance Indicator. More implementation details will be described later in this document.

There is number of possible operations in the network that will influence the capacity provided by the instantiated VNFCs and in consequence affect licensing. These operations include:
Initial deployment
Decommissioning
Scaling In
Scaling Out
Scaling Up
Scaling Down
Migration VNF initial deployment: for each VNFC IRL license quantities shall be updated, depending on the infrastructure and/or $3^{rd}$ party resources that are used by each VNFC. VNFC NSL license quantities shall be added to the used license quantity/count for that VNF depending on the capacity that the initial configuration will provide. The corresponding used quantities for each license shall be updated, both for NSL and IRL based on what was actually instantiated. Some NSL licenses will be related to specific features that the customer wants to enable for the VNF. The used license count shall be updated, but in this case by 1 for each VNFC instantiated and only on the first instantiation.

VNF decommissioning: opposite to initial allocation, it will release all related licenses and in effect the used license count will be reduced.

VNFC Scale Up: more resources are used, the type and the quantity to be added to the used license count will depend on the $3^{rd}$ party and resource used. The corresponding used quantities for each license shall be updated, both for NSL and IRL. License updates will depend on the difference between the old and the new deployment flavour capacity and resource usage, typically the IRL shall not change, but NSL quantity usage shall increase because the vertical scaling will increase the capacity of the VNF to handle more load; so the difference in capacity shall increase the corresponding license count. For NSL type, because with the new flavour more capacity is available to the customer, the count of the used capacity of the corresponding NSL licenses shall increase.

VNFC Scale Down: opposite to scale up, freed delta licenses shall be released.

VNFC Scale Out: any license associated to the VNFC shall be considered in the license calculation and used license count shall be updated both for NSL and IRL. In short, this means instantiation more VNFCs. Since adding a VNFC will increase the capacity of the VNF available to the customer, NSL used licenses quantity/count shall be increased due to the extra capacity the node is capable of handling (in case this is handled like a right to use then in one embodiment the increase in used capacity is 1 per each additional VNFC instance).

VNFC Scale In: opposite to scale out, the freed licenses shall be released and usage counts updated accordingly (i.e. reduced).

VNFC Migration: capacity shall be transferred to the new host, but overall license count would be unaffected. This may be more complex if a deployment flavour is changed during migration (but this is not the typical case); in that case if there is a change of used licenses this corresponding used license count shall be updated.

In particular some of these operations can influence also other, related, Virtual Network Functions. For instance, if a VNF is scaled out to handle more capacity this can be due to the number of client connections that are to be supported, which means that the number of used connection licenses needs to be increased (i.e. in case of pre-paid licensing model the number of available licenses will be reduced).

As non-limiting examples of the capacity parameter one skilled in the art could identify a number of subscribers, number of ports, number of processes, number of connections, or volume of data handled. It is understood, however, that other alternative examples of the capacity parameters may be envisaged.

In a preferred embodiment the capacity parameter comprises a second parameter applicable in case of scaling-in and scaling-out, wherein scaling-in comprises adding an instance of a Virtual Network Function Component and scaling-out comprises removing an instance of a Virtual Network Function Component. In short, this means that there may be more than one VNFC created based on one VDU and if the traffic/workload demand increases it is possible to increase the actual capacity handled by increasing the number of instantiated VNFCs (scaling-in). It is also possible to achieve the opposite; if the traffic/workload demand drops it is possible to reduce the number of instantiated VNFCs (scaling-out).

In yet another preferred embodiment the capacity parameter comprises a third parameter applicable in case of scaling-up and scaling-down. Scaling-up comprises increasing at least one of CPU power, memory size and other characteristics of virtual resources available for the instantiated Virtual Network Function Component. Scaling-down comprises the opposite—reducing at least one of CPU power, memory size and other characteristics of virtual resources available for the instantiated Virtual Network Function Component. Scaling-up/down allows for responding to changing workload demand by maintaining the constant number of instantiated VNFCs and changing the resources available to the instantiated VNFCs so that processing may be more efficient when the workload increases (with more resources) or preventing resource wasting in case of workload drop and when less resources are needed.

As mentioned above the capacity parameter may include a second parameter applicable in case of scaling-in and scaling-out or a third parameter applicable in case of scaling-up and scaling-down. More details about practical implementation of these second and third parameters are now to be described.

Operations of scaling happen when there is a need to change the capacity provided by the instantiated VNFCs. For example, if there is one VNFC instantiated that can handle 100000 subscribers and the network operator wants to increase this capacity to 150000 scaling is needed. One way of achieving this would be by instantiating a second VNFC in a deployment flavour capable of handling 50000 subscribers. This would be scaling-out. As a result the total capacity would be 100000+50000=150000 subscribers. Alternatively, scaling-up could be applied. This means that the one instantiated VNFC would have vCPU and/or RAM increased to a size that allows for handling 150000 subscribers. It could be said that the VNFC has been re-instantiated in another deployment flavour. Corresponding explanation applies to scaling-in and scaling-down where fewer number of VNFCs instantiated is needed or less computing resources vCPU and/or RAM.

The parameter related to scaling that is reported may be 1.5 if it is explicitly identified as scaling factor. This means that the licensing database will multiply the licensing capacity currently recorded by the explicitly reported scaling factor. Alternatively, the parameter related to scaling is just the capacity that is available after the operation of scaling. By recording the new capacity in VDU/NSD (or files associated with VDU/NSD) the licensing database receives the updated capacity and updates its records from the old 100000 to the new 150000.

Scaling may be planned or automatic; this depends on the technique used for scaling and depends on individual implementation in the network. For example, Performance Indicators (PI) are collected and the customer knows that current capacity used is 100000. However, because summer is approaching and in certain holiday resort area the number of users is expected to grow. This means that more instances of the VNFC VDU1 are needed. With auto-scaling, when the subscriber PI goes above 100000 then a scaling procedure is started and a new instance added in case of scale out, when goes again below 100000 scale in is triggered and one VNFC Instance decommissioned.

In embodiments of the present invention capacity and right to use licenses directly related to the VNF/VNFC instances can be automatically tracked by MANO because they are directly related to lifecycle of the VNF. Scaling (in/out as well as up/down) will increase or decrease license count because it updates the used capacity (i.e. information indicative of usage of instantiated VNFCs will be updated as a result of scaling). Migration of instantiated VNFCs will keep usage figures up to date too—the license count in the source Data Centre is decreased and the license count in the destination Data Centre is increased.

If capacity can be directly correlated with the number of VNFC instantiated or with a deployment of a different flavour of a VNF/VNFC (for the VNF in which 200000 subscribers can be handled with a VNFC with a deployment flavour including 4 vCPU (virtual Central Processing Unit) and 32 GB of RAM and every additional 300000 subscriber need a VNFC with a deployment flavour including 6 vCPU and 48 GB of RAM) the used license count can be the number of subscriber handled. If capacity cannot be directly correlated capacity can be dynamically updated monitoring from the VNFM specific KPI/PI, where KPI stands for Key Performance Indicator.

For some VNFs it is difficult to define a direct correlation with the scaling actions and the number or type of VNFCs deployed. To register the correlation a set of performance indicators is specified in order to calculate capacity. These performance indicators need to be monitored and when a threshold is crossed they will record the maximum or average used capacity depending on the type of capacity calculation that is defined for the license. The capacity value over a certain period will have to be converted in order to use capacity and license counts updated for later reporting. For instance if the maximum number of subscribers is used as a parameter to indicate the capacity of the license then a threshold may be set and when the threshold is crossed the value is recorded as the maximum capacity used. In alternative embodiments the number of subscriber over a certain period of time may be used, e.g. number of subscribers per hour during a week period. In any case the KPI (Key Performance Indicator) that the VNF produces may be collected by the VNFM to be used for billing.

The license counts are defined per license type, for instance a license can be MSC_call_processed_per_second, which defines the number (count) of calls processed that the VNF realising the function of MSC (mobile switching centre) can handle. This means that license type refers to license based on the same type of Performance Indicator.

In one example embodiment now to be described the licensing counts are associated with a VDU_processing_unit_blade (VDU1) and each instance of VNFC based on VDU1 that is deployed (VNF of type MSC named MSC_1) can handle 500 calls processed per second. When the VNF named MSC_1 is instantiated with a configuration which includes 3 VDU_processing_unit_blade, MSC_call_processed_per_second goes from 0 to 1500 used capacity. If another VDU_processing_unit_blade is added then the MSC_call_processed_license_count goes up to 2000. The above calculations assume that this is the first VNF that has this type of license.

If another MSC is created (VNF of type MSC named MSC_2) with basic 3 VDU_processing_unit_blade then the total used licenses goes to 3500 (i.e. it allows handling 3500 calls processed per second). In this way the capacity (and capacity based licensing) can be associated with the instantiation of VDU_processing_unit_blade. This approach is applicable in the case of pre-paid licenses.

On the other hand, if the capacity is variable, then when the first MSC is instantiated (i.e. VNF of type MSC named MSC_1) monitoring the capacity is started too. The first capacity level for that MSC (VNF of type MSC named MSC_1) is monitored and after observation over a certain time period (for example over 24-hour period) it is found that MSC_1 delivered capacity is 1800 calls processed per second. The VNF Manager will receive the capacity PI counters from the EM or from the MSC_1 itself as a capacity of type VDU_processing_unit_blade. The same will be done for MSC_2 and in this case the delivered capacity is 1600. Total used capacity for VDU_processing_unit_blade will be in this case 1800+1600=3400. This approach is applicable in the case of post-paid licenses.

These licensing counts are eventually recorded in the licensing database. The licensing database contains licensing counts totalized for each license type. Each license type shall be associated with a some capacity Performance Indicator that is monitored for the VNF/VNFC instance and based on the value that it achieves the licensing database will be updated. The licensing database then, for different license types and depending on whether these are pre-paid or post-paid licenses will produce billing records (invoice) or will implement enforcing of the pre-paid licenses if necessary.

In a preferred embodiment information indicative of feature based licenses is recorded in a third information field associated with a Virtual Network Function Descriptor (VNFD).

Figure 4:
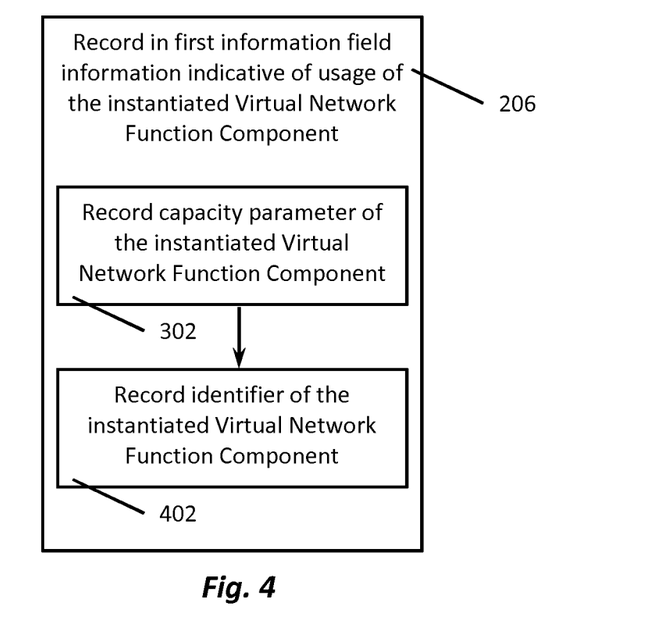

Preferably, the usage of the at least one instantiated Virtual Network Function Component recorded in said first information field comprises information indicative of a specific functional capability enabled by said instantiated Virtual Network Function Component, 402, as illustrated in FIG. 4. This allows for feature based licensing. The specific functional capability may be a customization of a standard feature for a specific market, an optimization for a specific network topology or just an operator requested feature. When a feature is specifically defined at a request of an operator there is no need to track actual usage, the feature carries out the requested functions and it is enough to record the fact that the VNFC providing said requested feature has been instantiated. These features are normally related to the VNF, so in order not to be repeated more than once for one VNF the license is preferably associated with the VNFD and not with a single VDU.

Figure 5:
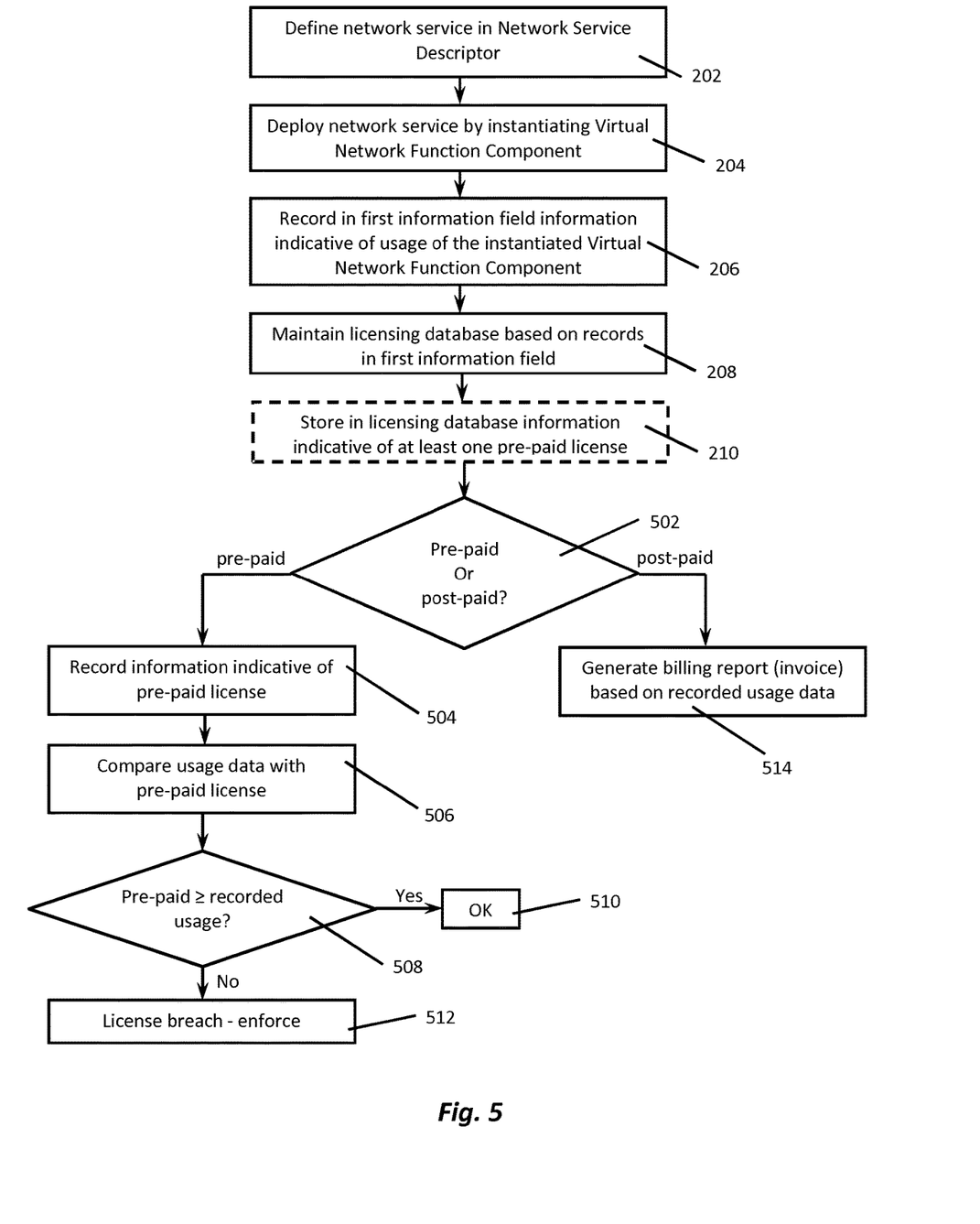
FIG. 5 is a flowchart illustrating a method for monitoring operation of a network service for licensing control in a virtual network environment in another embodiment of the present invention.

With reference to FIG. 5 further embodiments of the method are now to be described. Once the operations 202-210 described earlier are completed the licensing database comprises the necessary information for implementing licensing control. If the licensing is based on pre-paid licenses, 502, 504, the licensing control may be performed in real time. The method in this embodiment comprises comparing, 506, the information indicative of usage of the at least one instantiated Virtual Network Function Component, as stored in said licensing database, with the information indicative of the at least one pre-paid license. If the operation of comparing indicates that the usage of the at least one instantiated Virtual Network Function Component exceeds, 508, the usage allowed by the at least one pre-paid license the method comprises enforcing, 512, said at least one pre-paid license. On the other hand if the actual reported usage is within capacity the function is started (or allowed to operate), 510. Enforcing a pre-paid license in case of breach of the license may be based on some pre-defined actions, which may be one of starting a grace period, raising a license alarm, the requested feature is not started using or is stopped if already started, or a golden license may be used. A grace period would give the network operator time to purchase the extra licenses that are needed according to the increased capacity used. Typically, however, the grace period would be used and at the end of the grace period the feature stops working for the exceeding capacity if no new license has been paid for. This approach is also referred to as Hard Enforcement (HE). A golden license is a license that if loaded (used) disables all license checks. It is normally time limited and allows use of the application for a certain period of time. The exact details of a golden license depend on implementation.

In the alternative embodiment based on post-paid licenses, right-hand branch starting at operation 502 the method comprises processing the information indicative of usage of the at least one instantiated Virtual Network Function Component, as stored in said licensing database, and generating billing information, 502, 514, based on results of said processing. The details of the processing of the usage info are not part of this invention. The processing may take into account fluctuations in traffic load and in consequence the resources used to handle this (more during day, less during night, etc.). In one embodiment the billing may be based on average capacity over time or similar.

Security of the licensing information is important and in a preferred embodiment the licensing information may be handled in a separate field or in a file associated with the VDU. This is because if the data is modified the license calculation would report incorrect usage and would result in incorrect billing, i.e. license cost in the post-paid licensing. In case of pre-paid the license database should also be protected so that available licenses cannot be tampered with to avoid functions to stop working. Therefore, in a preferred embodiment the method comprises applying cryptographic protection to the information fields, be it an information field in the NSD or VDU, or in the licensing database or a file associated with the NSD or VDU. Preferably the information field (or the whole file) can be digitally signed. Alternatively a hash value may be calculated for the information field (or the whole file) and this hash value may then be digitally signed. The hash value is generated by a hash function and these are well known in the art and one of MD4, MD5, SHA-1, SHA-2 or others may be used.

In one embodiment a virtual license table (VLT) in a licensing database contains for each descriptor the following information:
license_id;
license_type;
license_source to indicate if the license is related to the service towards the customer (internal) or is due to usage of 3rd party (external);
Enforcement type (Hard or soft);
Parameters valid only for Hard Enforcement type include:
  grace_period in days
    golden_license enabled Boolean (if the NS or VDU is un-blocked when a golden license is used)
    golden_license_duration in days.
Parameters only valid for Soft Enforcement type include:
  KPI to be monitored
    KPI to quantity rule (this is a rule that defines how the KPI values shall be converted to capacity values).

Capacity values for individual VNFC instances are recorded in information fields associated with VDUs that define the VNFCs. Network service may need a number (more than one) VNF to be implemented. This, in turn means that for deployment of one network service there will be more than one VDU with recorded capacity information for licensing purposes. From the point of view of the NFV-MANO system there may be more than one network service deployed. This means more than one NSD with capacity information from plurality of VDUs recorded for licensing purposes. In order to have all the licensing information centralised for generating billing/invoicing (post-paid) and enforcing (pre-paid) there is a global licensing database. For embodiments in which feature based licenses are included information derived from VNFD (Virtual Network Function Descriptor) is used to populate the licensing database. These features are normally related to the VNF, so in order not to be repeated more than once for one VNF the license is preferably associated with the VNFD and not with a single VDU. The feature based licensing information may be recorded in an information field associated with a VNFD. This information field may be part of the VNFD or may be in a file associated with the VNFD. The licensing database contains total knowledge obtained through descriptors of deployed VNFs and all these descriptors, being part of VNF deployment, are subject to VNF lifecycle. There may be various ways of implementing the Licensing Database. In one embodiment it may be included in the VNF Catalogue. In alternative embodiments the licensing database can be independent from the VNF Catalogue. In some implementations the entire license engine can be a sub-component of the VNF manager that can be used independently from the VNFM.

In embodiments based on Hard Enforcement (i.e. pre-paid licenses) available license quantity is loaded to the VNF Catalogue, 1024, in a license table, so that these data can be used during life cycle management. The available licenses in the VNF Catalogue are updated by reducing their number by figures corresponding to actual usage of the deployed VNFs. A license in the VNF Catalogue preferably contains the NSD reference to which it refers, the VDU reference, the quantity for the license type, the license type and the VNF flavour reference to which it refers. Preferably right to use licenses that enable specific SW features of the VNF need some interaction with the VNF to enable or disable the feature at run time. This is normally done by the EM that does it using its proprietary interface and also handles alarms, grace periods, emergency licenses. In embodiments where Soft Enforcement is used (i.e. post-paid licenses) the VNF reports the features enabled for post-paid reporting. The above is described with the assumption that the licensing database is integrated with the VNF Catalogue, 1024. In an alternative embodiment if the licensing database is separate from the VNF Catalogue, 1024, the above described operations are carrier out in the licensing database.

More detailed embodiments will be described now in order to illustrate the method in operation.

Algorithm 1—Monitoring Capacity

Or-Vnfm, Ve-Vnfm-em and Ve-Vnfm-em: reference points that report KPI/PI variations.

ThresholdUsesResourceSelection: Defines the object instances associated with the threshold. The objects depend on the reference point using this information element. When used on Or-Vi or Vi-Vnfm, it will be virtualised resources. When used on Or-Vnfm or Ve-Vnfm (Ve-Vnfm-em or Ve-Vnfm-em) reference point, it will be VNF instances. When used on Os-Ma-nfvo reference point, it will be Network Service instances.

There are two ways to implement capacity handling for VNF capacity parameters. The description below refers to FIG. 1.

1. Traditional EM (Element Management) collection of PM counters (Performance Management) and threshold. In this case the VNF application reports PM counters that are in fact KPI/PI and in case of threshold crossing this is reported to the VNF Manager to update used capacity license counts.
   a. VNF, 107, sends a threshold crossing message to EM, 106;
   b. EM, 106, sends a threshold crossing message with identifier of the VNF that sent the original threshold crossing message to VNFM, 103, over Ve-Vnfm-em reference point;
   c. VNFM, 103, reports the crossing to NFVO, 102, which performs lookup of the VNF type using the received VNF identifier and in accordance with the type of threshold crossed updates the used capacity in VNF Catalogue if the licensing database is integrated with the VNF Catalogue, 1024. In an alternative embodiment if the licensing database is separate from the VNF Catalogue, 1024, the updates will be recorded in the licensing database.

2. VNF reports threshold crossing directly to the VNF Manager to implement used capacity updates.
   a. VNF, 107, send a threshold crossing message including its own VNF identifier to VNFM, 103, over Ve-Vnfm-vnf reference point;
   b. VNFM, 103, reports the crossing to NFVO, 102, which performs lookup of the VNF type using the received VNF identifier and in accordance with the type of threshold crossed updates the used capacity in VNF Catalogue if the licensing database is integrated with the VNF Catalogue, 1024. In an alternative embodiment if the licensing database is separate from the VNF Catalogue, 1024, the updates will be recorded in the licensing database.

Figure 6:
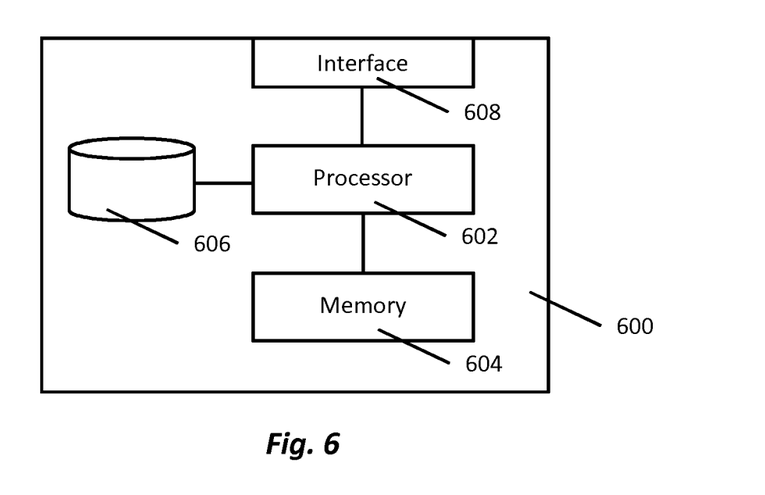
FIG. 6 to FIG. 9 are diagrams illustrating apparatus for monitoring operation of a network service for licensing control in a virtual network environment in different embodiments of the present invention.

With reference to FIG. 6 an embodiment of an apparatus for monitoring operation of a network service for the purpose of licensing control in a virtual network environment adapted to operate in accordance with the method disclosed in this document is now to be described.

Illustrated in FIG. 6 is one embodiment of the apparatus, 600, for monitoring operation of a network service for the purpose of licensing control in a virtual network environment. The network is managed by a Network Functions Virtualisation Management and Orchestration, NFV- MANO, system. The apparatus, 600, comprises a processor, 602, and a memory, 604, wherein the memory contains instructions executable by the processor, 602. In operation, by executing the instructions by the processor, 602, the apparatus, 600, is operative to define the network service in a Network Service Descriptor and to deploy the network service using at least one Virtual Network Function instance. The VNF instance is identified in said Network Service Descriptor. The Virtual Network Function is deployed by instantiating at least one Virtual Network Function Component defined by a Virtualisation Deployment Unit. Said Virtualisation Deployment Unit (VDU) is associated with said Virtual Network Function. The apparatus is further operative to record in a first information field associated with the Network Service Descriptor information indicative of usage of the at least one instantiated Virtual Network Function Component and to maintain a licensing database, 606, 706, for storing information indicative of usage of the at least one instantiated Virtual Network Function Component based on records in the first information field.

Depending on embodiment the licensing database may be implemented as integral part, 606, of the apparatus 600, or as an element separate, 706, from the apparatus 700. The first embodiment is shown in FIG. 6 and the second one in FIG. 7.

Figure 7:
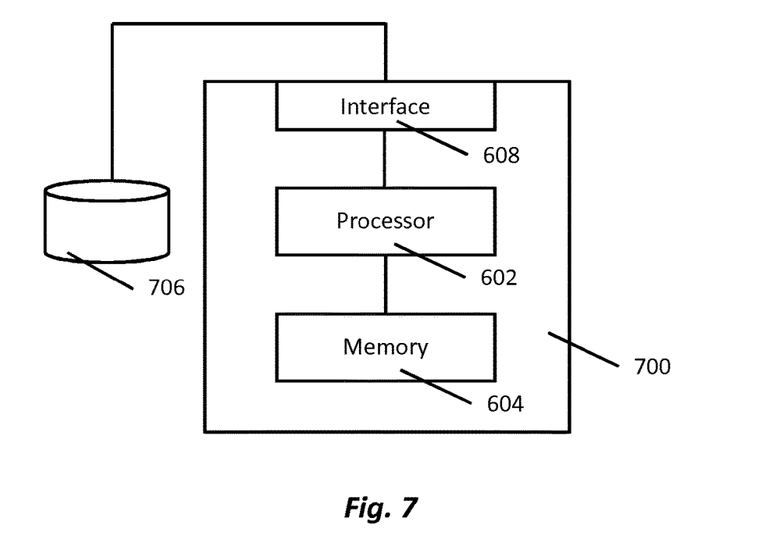

The apparatus, 600, 700, further comprises an interface 608 for communication with other element of the NFV-MANO system.

In an embodiment in which if pre-paid licences are used the apparatus is operative to store in the licensing database, 606, 706, information indicative of at least one pre-paid license. This information indicative of the pre-paid license may include a maximum value of certain performance indicator, for example 500 ports serviced and it determines the maximum value the deployed capacity may go without breaching conditions of the pre-paid license.

In performing the operation of recording the apparatus, 600, is operative to record a capacity parameter of the at least one instantiated Virtual Network Function Component. This capacity parameter may be related to the number of ports serviced in one embodiment or may be related to the number of calls processed per second handled. These are non-limiting examples and many more performance indicators have been suggested in this document and even more could be envisaged by a person skilled in the art.

In one embodiment the apparatus, 600, is operative to obtain the capacity parameter from a second information field associated with the Virtualisation Deployment Unit defining said instantiated Virtual Network Function Component.

Depending on embodiment the first information field associated with the Network Service Descriptor may be one of monitoring_parameter field included in the Network Service Descriptor or a dedicated information field added to the information structure of the Network Service Descriptor, or a dedicated file associated with the Network Service Descriptor. Similarly, the second information field associated with the Virtualisation Deployment Unit may be one of monitoring_parameter field included in the Virtualisation Deployment Unit or a dedicated information field added to the information structure of the Virtualisation Deployment Unit, or a dedicated file associated with the Virtualisation Deployment Unit.

Preferably, the usage of the at least one instantiated VNFC recorded in said first information field comprises information indicative of a specific functional capability enabled by said instantiated Virtual Network Function Component.

The apparatus, 600, 700, monitors operation of a network service for the purpose of licensing control and this involves enforcing pre-paid licenses and billing (invoicing) for post-paid licenses. In operation, in the case of pre-paid licenses, the apparatus 600, 700 is operative to compare the information indicative of usage of the at least one instantiated VNFC with the information indicative of the at least one pre-paid license and enforce said at least one pre-paid license if the operation of comparing indicates that the usage of the at least one instantiated VNFC exceeds usage allowed by the at least one pre-paid license.

In operation, in the case of post-paid licenses, the apparatus, 600, 700, is operative to process the information indicative of usage of the at least one instantiated VNFC and generate billing information based on results of said processing.

Security of the licensing information is important and in a preferred embodiment the apparatus, 600, 700, is operative to apply cryptographic protection to the information fields, be it an information field in the NSD or VDU, or in the licensing database or a file associated with the NSD or VDU. Preferably, the information field (or the whole file) can be digitally signed. Alternatively, the apparatus is operative to calculate a hash value for the information field (or the whole file) and this hash value may then be digitally signed. The hash value is generated by a hash function and these are well known in the art and one of MD4, MD5, SHA-1, SHA-2 or others may be used.

Figure 8:
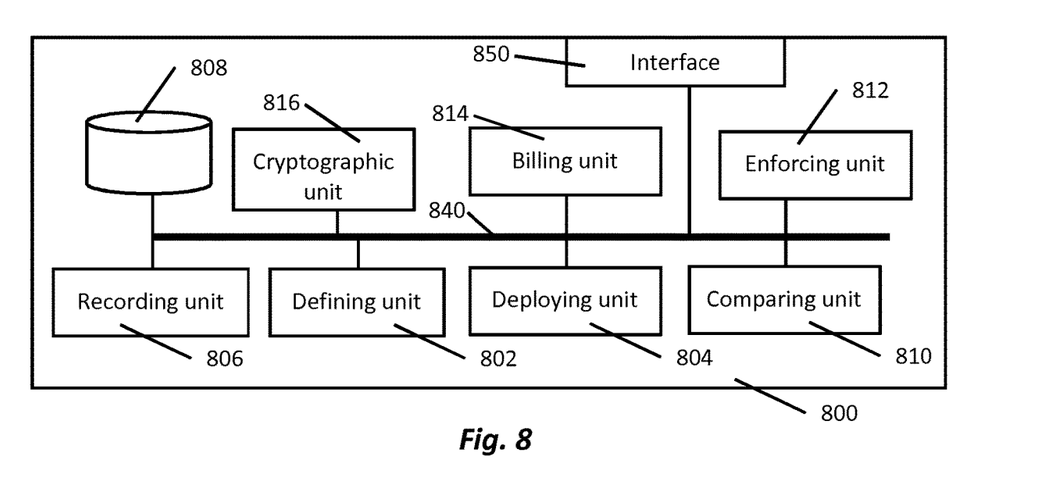
Figure 9:
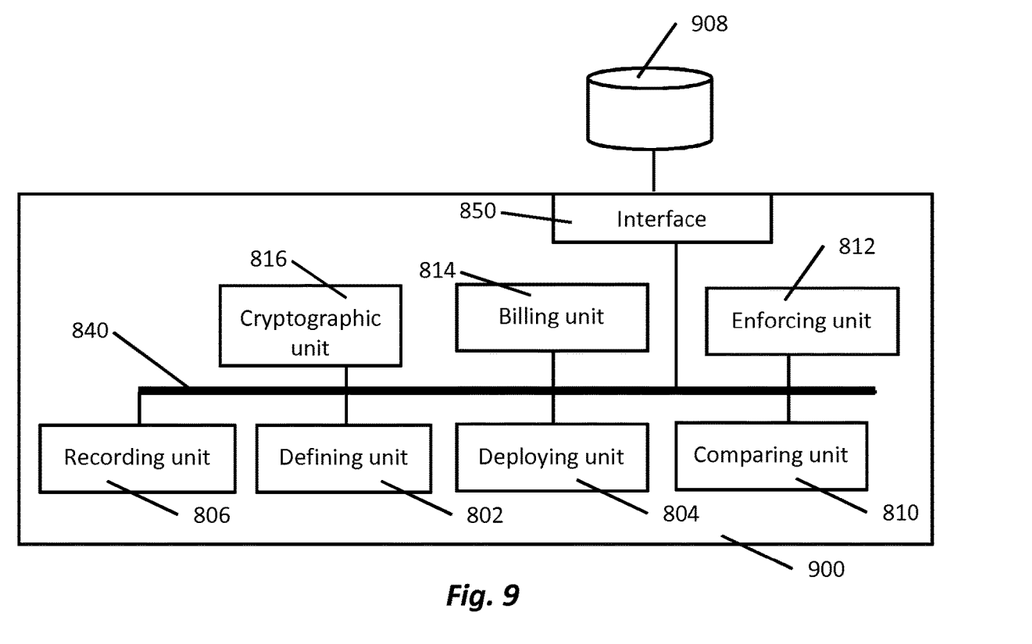

An apparatus, 800, 900, for monitoring operation of a network service for the purpose of licensing control in a virtual network environment managed by a Network Functions Virtualisation Management and Orchestration, NFV-MANO, system, the apparatus comprising:

a defining unit, 802, for defining the network service in a Network Service Descriptor;

a deploying unit, 804, for deploying the network service using at least one Virtual Network Function instance identified in said Network Service Descriptor by instantiating at least one Virtual Network Function Component defined by a Virtualisation Deployment Unit, wherein said Virtualisation Deployment Unit is associated with said Virtual Network Function;

a recording unit, 806, for recording in a first information field associated with the Network Service Descriptor information indicative of usage of the at least one instantiated Virtual Network Function Component;

a licensing database, 808, 908, for storing information indicative of usage of the at least one instantiated Virtual Network Function Component based on records in the first information field.

The apparatus, 800, 900, further comprises an interface 850 for communication with other element of the NFV-MANO system.

Preferably, the apparatus, 800, 900, comprises:

comparing unit, 810, for comparing the information indicative of usage of the at least one instantiated Virtual Network Function Component, as stored in said licensing database, with the information indicative of the at least one pre-paid license;

enforcing unit, 812, for enforcing said at least one pre-paid license if the operation of comparing indicates that the usage of the at least one instantiated Virtual Network Function Component exceeds usage allowed by the at least one pre-paid license.

Preferably, the apparatus, 800, 900, comprises a billing unit, 814, for processing the information indicative of usage of the at least one instantiated Virtual Network Function Component, as stored in said licensing database, and generating billing information based on results of said processing.

Preferably, the apparatus, 800, 900, comprises a cryptographic unit, 816, for applying cryptographic protection to the information fields.

In a preferred embodiment the defining unit, 802, deploying unit, 804, recording unit, 806, comparing unit, 810, enforcing unit, 812, billing unit, 814, and cryptographic unit, 816, are connected to a common bus, 840, that allows for communication between these units. In the embodiment illustrated in FIG. 8 also the licensing database 808 is connected to the common bus 840. In the alternative embodiment illustrated in FIG. 9 the licensing database is connected to the interface, 850.

ABBREVIATIONS

ADMF Administration Function
CSP Cloud Service Provider
DF Delivery function
E2E End to End
ETSI European Telecommunications Standards Institute
FB Functional Block
FCAPS Fault Configuration Accounting Performance and Security
FEP Front End Processor
FG Forwarding Graph
HW Hardware
ICEs Intercepting Control Elements
ISG Industry Specification Group
ISP In service Performance
IT Information Technology
KPI Key Performance indicator
LEMF Law Enforcement Monitoring Facilities
NF Network Function
NFV Network Functions Virtualisation
NFVO Network Functions Virtualisation Orchestrator
NS Network Service
NSD Network Service Descriptor
OS Operating System
PI Performance indicator
PNF Physical Network Function
RBAC Role Based Access Control
SDN Software Defined Networking
SOD Separation of duty
SW Software
TAP TAP linux device interface
vCPU virtual Central Processing Unit
VDU Virtualisation Deployment Unit
VI Virtual Infrastructure
VIM Virtual Infrastructure Manager
VL Virtual Link
VLAN Virtual Local Area Network
VLD Virtual Link Descriptor
VM Virtual Machine
VNF Virtualised Network Function
VNFC Virtual Network Function Component
VNFCI Virtual Network Function Component Instance
VNFD Virtual Network Function Descriptor
VS Virtual Storage

The invention claimed is:

1. A method for monitoring operation of a network service for licensing control in a virtual network environment managed by a Network Functions Virtualisation Management and Orchestration, NFV-MANO, system, the method comprising:
defining the network service in a Network Service Descriptor;
deploying the network service using at least one Virtual Network Function instance identified in said Network Service Descriptor by instantiating at least one Virtual Network Function Component defined by a Virtualisation Deployment Unit, wherein said Virtualisation Deployment Unit is associated with said Virtual Network Function;
recording in a first information field associated with the Network Service Descriptor, information indicative of usage of the at least one instantiated Virtual Network Function Component, wherein the operation of recording comprises recording a capacity parameter of the at least one instantiated Virtual Network Function Component, wherein the capacity parameter varies based at least on a number of subscribers of the at least one instantiated Virtual Network Function Component; and
maintaining a licensing database for storing information indicative of usage of the at least one instantiated Virtual Network Function Component based on records in the first information field,
wherein the usage of the at least one instantiated Virtual Network Function Component recorded in said first information field comprises information indicative of a specific functional capability enabled by said instantiated Virtual Network Function Component,
wherein the specific functional capability is a customization of a feature for a specific market or an optimization for a specific network topology, and
wherein when the feature is instantiated, the feature carries out said Virtual Network Function.

2. The method according to claim 1, wherein if pre-paid licenses are used the method comprises storing in the licensing database information indicative of at least one pre-paid license.

3. The method according to claim 1, wherein the capacity parameter is obtained from a second information field associated with the Virtualisation Deployment Unit defining said instantiated Virtual Network Function Component.

4. The method according to claim 1, wherein the first information field associated with the Network Service Descriptor is one of monitoring_parameter field included in the Network Service Descriptor or a dedicated information field added to the information structure of the Network Service Descriptor, or a dedicated file associated with the Network Service Descriptor.

5. The method according to claim 3, wherein the second information field associated with the Virtualisation Deployment Unit is one of monitoring_parameter field included in the Virtualisation Deployment Unit or a dedicated information field added to the information structure of the Virtualisation Deployment Unit, or a dedicated file associated with the Virtualisation Deployment Unit.

6. The method according to claim 1, wherein the capacity parameter defines one of number of ports, number of processes, number of connections or volume of data handled.

7. The method according to claim 1, wherein the capacity parameter comprises a second parameter applicable in case of scaling-in and scaling-out, wherein scaling-out comprises adding an instance of a Virtual Network Function Component and scaling-in comprises removing an instance of a Virtual Network Function Component.

8. The method according to claim 1 comprising:
comparing the information indicative of usage of the at least one instantiated Virtual Network Function Component, as stored in said licensing database, with the information indicative of the at least one pre-paid license;

enforcing said at least one pre-paid license if the operation of comparing indicates that the usage of the at least one instantiated Virtual Network Function Component exceeds usage allowed by the at least one pre-paid license.

9. The method according to claim 1 comprising applying cryptographic protection to the information fields.

10. An apparatus for monitoring operation of a network service for licensing control in a virtual network environment managed by a Network Functions Virtualisation Management and Orchestration, NFV-MANO, system the apparatus comprising a processor and a memory, the memory containing instructions executable by the processor such that the apparatus is operative to:

define the network service in a Network Service Descriptor;

deploy the network service using at least one Virtual Network Function instance identified in said Network Service Descriptor by instantiating at least one Virtual Network Function Component defined by a Virtualisation Deployment Unit, wherein said Virtualisation Deployment Unit is associated with said Virtual Network Function;

record in a first information field associated with the Network Service Descriptor information indicative of usage of the at least one instantiated Virtual Network Function Component, wherein in performing the operation of recording the apparatus is operative to record a capacity parameter of the at least one instantiated Virtual Network Function Component, wherein the capacity parameter varies based at least on a number of subscribers of the at least one instantiated Virtual Network Function Component; and maintain a licensing database for storing information indicative of usage of the at least one instantiated Virtual Network Function Component based on records in the first information field, wherein the usage of the at least one instantiated Virtual Network Function Component recorded in said first information field comprises information indicative of a specific functional capability enabled by said instantiated Virtual Network Function Component, wherein the specific functional capability is a customization of a feature for a specific market or an optimization for a specific network topology, and wherein when the feature is instantiated, the feature carries out said Virtual Network Function.

11. The apparatus according to claim 10, wherein if pre-paid licenses are used the apparatus is operative to store in the licensing database information indicative of at least one pre-paid license.

12. The apparatus according to claim 11, wherein the first information field associated with the Network Service Descriptor is one of monitoring_parameter field included in the Network Service Descriptor or a dedicated information field added to the information structure of the Network Service Descriptor, or a dedicated file associated with the Network Service Descriptor.

13. The apparatus according to claim 11 operative to:

compare the information indicative of usage of the at least one instantiated Virtual Network Function Component with the information indicative of the at least one pre-paid license;

enforce said at least one pre-paid license if the operation of comparing indicates that the usage of the at least one instantiated Virtual Network Function Component exceeds usage allowed by the at least one pre-paid license.

14. The apparatus according to claim 10 operative to obtain the capacity parameter from a second information field associated with the Virtualisation Deployment Unit defining said instantiated Virtual Network Function Component.

15. The apparatus according to claim 10, wherein the capacity parameter defines one of the number of subscribers, number of ports, number of processes, number of connections or volume of data handled.

16. The apparatus according to claim 10, wherein the capacity parameter comprises a second parameter applicable in case of scaling-in and scaling-out, wherein scaling-out comprises adding an instance of a Virtual Network Function Component and scaling-in comprises removing an instance of a Virtual Network Function Component.

17. The apparatus according to claim 10, wherein the capacity parameter comprises a third parameter applicable in case of scaling-up and scaling-down, wherein scaling-up comprises increasing and scaling-down comprises reducing at least one of: CPU power, memory size and other characteristics of virtual resources available for the instantiated Virtual Network Function Component.

* * * * *